May 7, 1929.　　　A. C. BERGLUND　　　1,711,917
MECHANICALLY OPERATED ROAD MAP
Filed March 23, 1928　　2 Sheets-Sheet 1
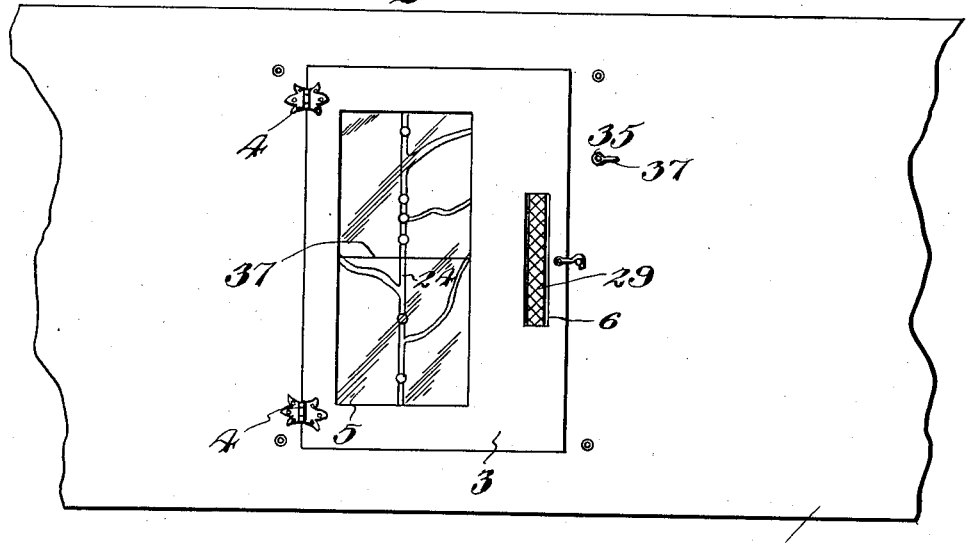
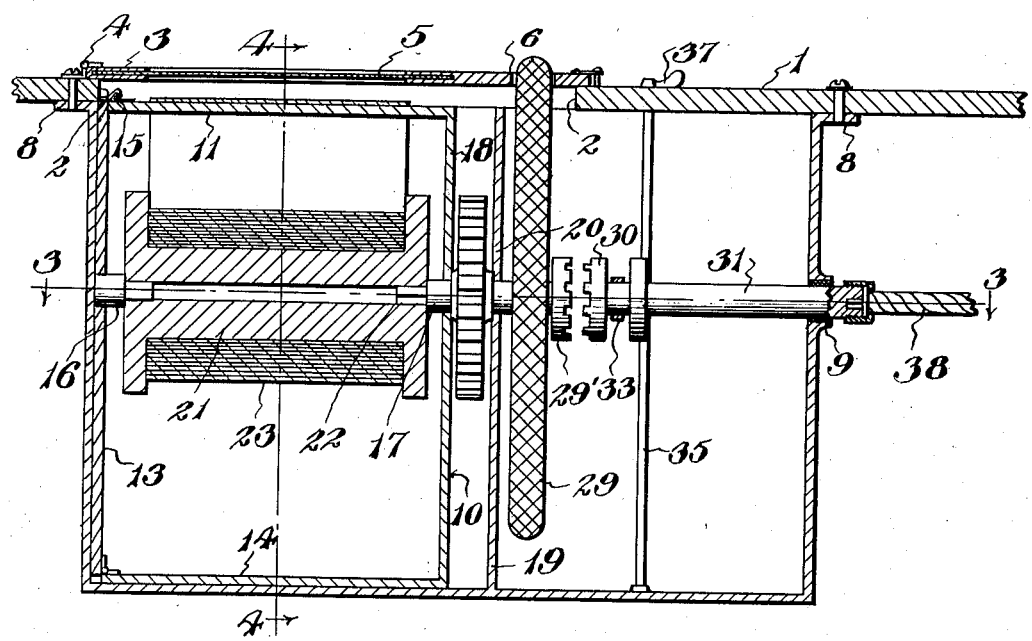
Inventor
A. C. Berglund
By Lacey & Lacey, Attorneys May 7, 1929.　　　A. C. BERGLUND　　　1,711,917
MECHANICALLY OPERATED ROAD MAP
Filed March 23, 1928　　2 Sheets-Sheet 2

Inventor
A. C. Berglund
By Lacey & Lacey, Attorneys

Patented May 7, 1929.

1,711,917

UNITED STATES PATENT OFFICE.

ABEL C. BERGLUND, OF BROWNING, MONTANA.

MECHANICALLY-OPERATED ROAD MAP.

Application filed March 23, 1928. Serial No. 264,118.

The present invention is directed to improvements in mechanically operated road maps.

The primary object of the invention is to provide a device of this character so constructed that it can be conveniently mounted upon the instrument board of an automobile in order that the map can be conveniently observed, the construction being such that when the automobile is in motion the map will be operated to position the locations thereon to correspond to the location of the automobile.

Another object of the invention is to provide a device of this character so constructed that a map can be easily and quickly removed from the device and another substituted therefor.

Another object of the invention is to provide a device of this character which is simple in construction, and one which is operated during the travel of the automobile, and wherein a web bearing the map will be wound upon spools during the travel of the automobile, means being provided to permit the ready removal of the spools for interchanging maps.

With these and other objects in view, this invention resides in the novel features of construction, formation, combination and arrangement of parts to be hereinafter more fully described, claimed and illustrated in the accompanying drawings in which,—

Figure 1 is a fragmentary view of an instrument board of an automobile, showing the device in place thereon.

Figure 2 is a sectional view on line 2—2 of Figure 3.

Figures 3, 4:
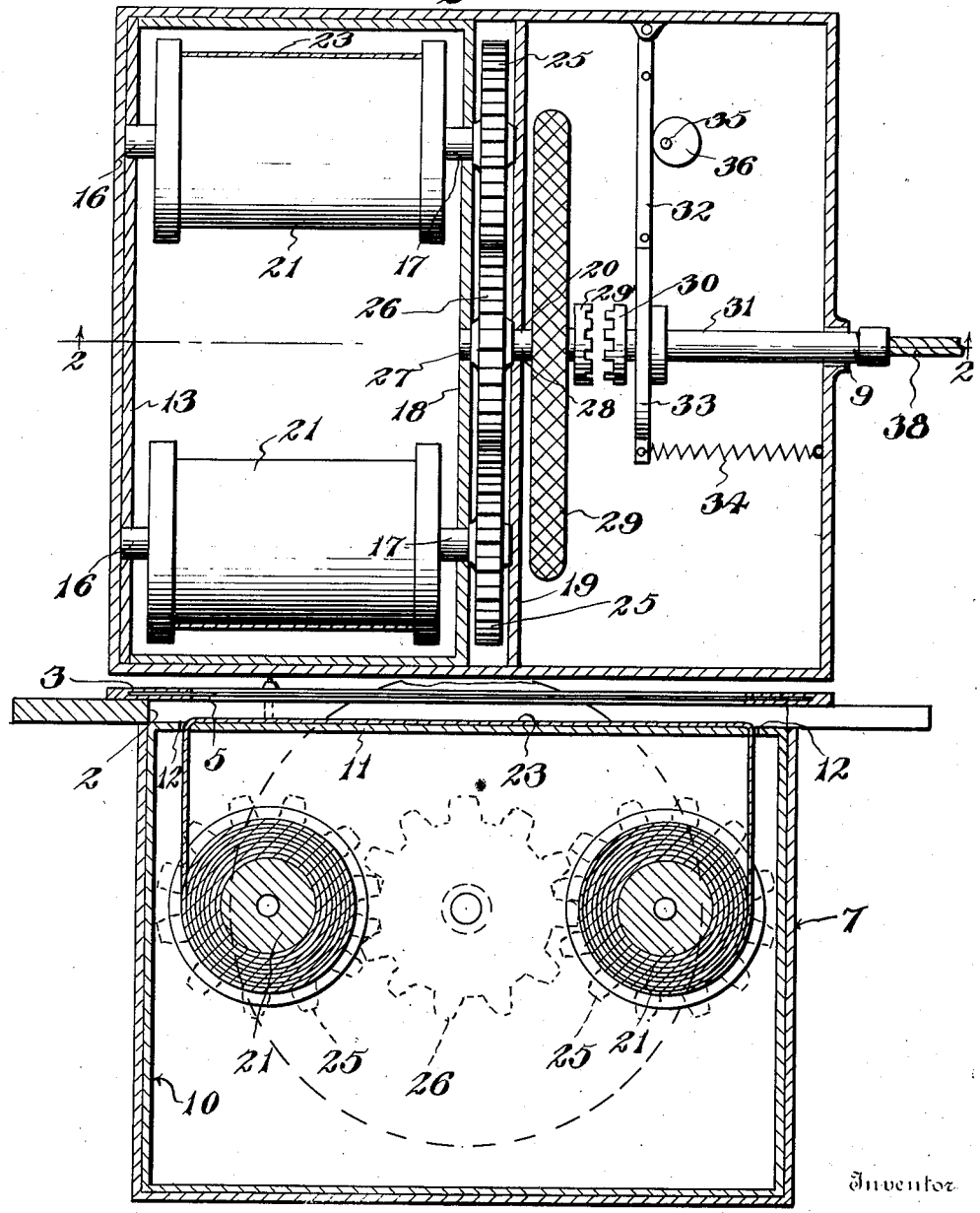
Figure 3 is a sectional view on line 3—3 of Figure 2.
Figure 4 is a sectional view on line 4—4 of Figure 2.

Referring to the drawings, 1 designates a portion of an instrument board of an automobile, and in which is formed a rectangular opening 2, there being a door 3 connected to the instrument board by hinges 4, said door having a glass pane 5 therein. The door normally closes the opening 2 and is provided with a slot 6, the purpose of which will be later explained.

A sheet metal container 7 is provided and is fixed to the instrument board by flanges 8, one side of the container having a bearing 9 formed therein, the purpose of which will later appear.

Removably mounted in the container is a casing 10, including a top 11 having slots 12 formed adjacent each end. The side 13 of the casing is hingedly connected to the bottom 14 thereof and is connected to the top 11 by catches 15, said sides carrying spaced trunnions 16 which are alined with stuff shafts 17 journaled in the side 18 of the casing. Spaced from the side 18 is a partition wall 19 having an open ended vertical slot formed therein.

Spools 21—21 are employed and are adapted to be supported within the casing 10 by trunnions 16 and stub shafts 17, the latter being squared, as at 22, to fix the spools thereto, in order that they will rotate therewith. It will be obvious that by swinging the side 13 upon its hinges the spools can be readily removed when desired.

A web 23 has its ends detachably connected to the spools 21 and it is upon this web that the road map is printed, as indicated by the numeral 24 in Figure 1. This web is movable in the slots 12 and is windable upon the spools 21—21, as will be understood. It will be of course understood that the webs can be interchanged in order that various trip itinerary may be used.

The stub shaft 17 has fixed thereon gears 25 and disposed therebetween and in mesh therewith is a gear 26 which is provided with a trunnion 27 journaled in the side 18, said gear also being provided with a shaft 28 journaled in the slot 20 of the wall 19, said shaft having fixed thereon a wheel 29, the periphery of which is adapted to extend through the slot 6 of the cover in order that it can be conveniently rotated manually. Fixed to the shaft 28 is a clutch disk 29' which cooperates with a similar disk 30 which is fixed to the inner end of the shaft 31 slidable in the bearing 9. Extended within the container 7 is a link 32 having a loop 33 upon its lower end for confining the shaft 31, said yoke being connected to the container by a coil spring 34 which serves to hold the clutch disks 29' and 30 disengaged, and to return them to such position after engagement.

Having its upper end engaged in the instrument board 1 and its lower end journaled in the bottom of the container is a rod 35 to which is fixed an eccentric 36, there being a handle 37 fixed to the upper end of the rod and in convenient reach of the driver, in order that the shaft may be rotated to actuate the eccentric.

Detachably connected to the outer end of the shaft 31 is a flexible drive shaft 38 which may be driven from the speedometer shaft of the automobile or from any other part found suitable for the purpose.

It will be obvious that when the eccentric 36 is rotated in one direction the clutch disk 30 will engage the clutch disk 29', thereby imparting rotary movement to the gear 26 and through the medium of the gears 25 the spools will be rotated in order to cause the map to travel over the top 11 during the movement of the automobile, said map being conveniently attached or detached from the spools when it is desired to change the maps. The glass pane 5 has an indicating line 37 in order that the position of the place or town upon the map will coincide therewith in order that the driver can readily see the location.

Owing to the slot 20 it will be apparent that upon opening the door 3 the casing 10 can be readily removed in order that maps may be changed, the slot 20 permitting the shaft 28 to disengage the wall 19, it being of course understood that when the casing 10 is removed the clutch disks will be disengaged. Since the periphery of the wheel 29 projects through the slot 6 the map can be shifted by operating said wheel when the clutch disks are disengaged.

It will be of course understood that the loop 33 will engage the clutch disk 30 when the eccentric 36 is moved in one direction in order to move the disk 30 inwardly so that the clutch disks will interlock to transmit movement to the spools, thus imparting movement to the map web.

Having thus described the invention, I claim:

1. In a road map for attachment to the instrument board of a motor vehicle, a container fixed to the instrument board, said instrument board having an opening therein, a door for closing the opening and having a glass panel carried thereby and a slot formed therein, a casing removably mounted in the container and having spools journaled therein, a top for the casing having slots therein, a map bearing web windable upon the spools and movable in the slots for exposing a stretch thereof under the panel, a gear train for driving the spools, a wheel associated with the gear train and having its periphery movable in the slot, means for driving the gear train from the vehicle, clutch means between the driving means and gear train for driving the spools when the clutch means is engaged, said wheel being manually operable to drive the spools when the clutch means is disengaged.

2. In a road map for attachment to a motor vehicle, a container fixed to the instrument board of the vehicle, said instrument board having an opening therein, a casing removably mounted in the container and having a pair of spools journaled therein, a map bearing web windable upon the spools and having a stretch exposed in the opening, means normally engaged for driving the spool, and thus the web, from a part of the vehicle, said means being disengaged upon removal of the casing from the container, and means for manually driving the spools upon disengagement of said means.

In testimony whereof I affix my signature.

ABEL C. BERGLUND. [L. S.]